May 21, 1929.   C. A. HARTUNG   1,714,366
PROCESS FOR THE STERILIZATION OF LIQUIDS
Filed May 8, 1926
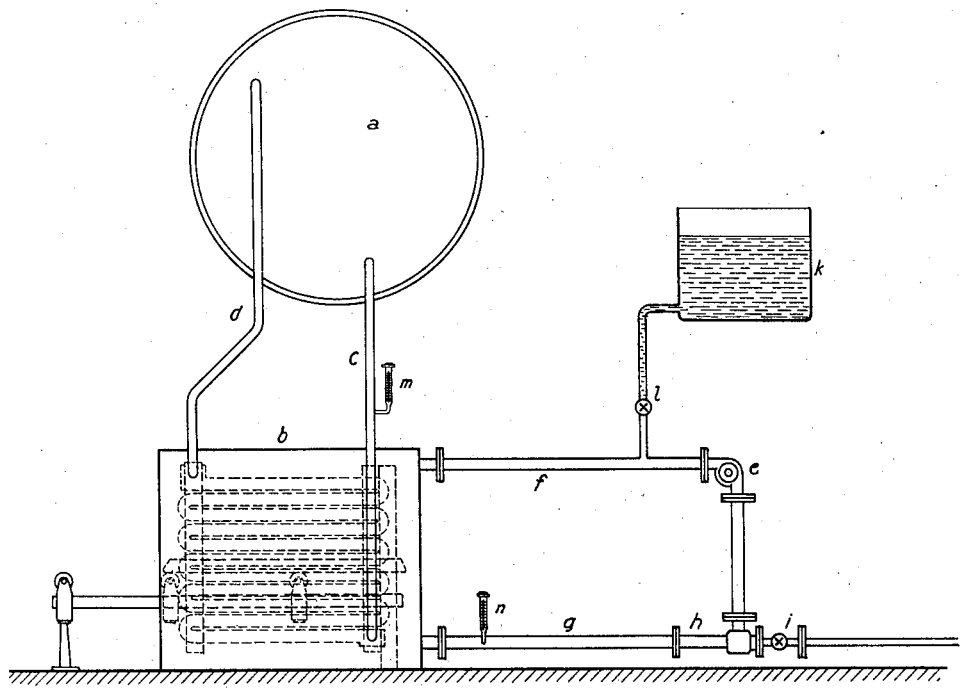
INVENTOR
Carl A. Hartung
BY
ATTYS.

Patented May 21, 1929.

1,714,366

UNITED STATES PATENT OFFICE.

CARL ADOLF HARTUNG, OF BERLIN, GERMANY.

PROCESS FOR THE STERILIZATION OF LIQUIDS.

Application filed May 8, 1926, Serial No. 107,731, and in Germany March 25, 1926.

When sterilizing goods, such as some kinds of liquid food stuff for example, which are sensitive to heat it is difficult to prevent the taste of the food being disagreeably affected. Various apparatus have been devised with the object of preventing this drawback, and remedy has been sought by circulating the liquid quickly past heating surfaces of special shape in order to avoid the disagreeable influence of undue heating. However, all these devices have proved insufficient as it was not possible to avoid local overheating of the goods to be sterilized. One of the undesirable results is the occurrence of albuminous deposits upon the heating surfaces forming a sticky, slimy coating which materially retards the heating process, so that local overheating is, instead of being avoided, incurred all the more. The undesirable result of such local overheating is, apart from the affected taste, a noxious smell of burnt food.

The new process according to the invention avoids these disadvantages and results in a sterilized product which is free from noxious tastes and odors. According to the invention the process mainly consists in circulating the liquid to be sterilized from a container past heating devices by means of which it is heated indirectly by another liquid on the heat exchanging principle; the said heating liquid being maintained at only a few degrees above the temperature of the liquid under treatment. Thus the increase in the temperature of the heating medium in the heating device takes place in exactly the same measure in which the heated liquid increases its temperature. The difference between the temperature of the heating medium and that of the liquid to be sterilized is kept approximately constant at all places, so that any injurious effects of overheating are successfully avoided, whilst the time required to properly heat the product to complete sterilization is reduced to the shortest possible.

The new process will now be described with reference to the accompanying drawing which is a diagrammatic illustration of a device suited to carry out the said process; the drawing being only an example of such device, for various other arrangements may be devised to carry out the new process.

In this drawing the container for the liquid to be sterilized is denoted by $a$; it is in communication with the heater $b$, working on the exchange principle, by means of a pipe $c$ through which the liquid from the container enters the heater, and a pipe $d$ through which it returns. The heater $b$ contains a closed pipe system which is shown in the form of a coil in broken lines. Circulation of the liquid through the system takes place automatically by the heated parts of the liquid constantly rising to the surface.

The closed tube system of the heater $b$ is encircled by another tube system through which the heating medium flows which, in this case, is assumed to be water and which is circulated through the system by means of a small centrifugal pump $e$ via the pipes $f$ and $g$. These said pipes contain a steam jet $h$ by means of which the circulating heating medium may be heated by opening the steam valve $i$. A reservoir $k$ is provided to compensate for both loss and expansion of the heating medium through the pipe $l$.

Thermometers $m$ and $n$ are provided in the tubes $c$ and $g$ respectively, and it is the duty of the attendant to so regulate the steam supply by means of the mixing device $h$, $i$ as to always approximately maintain that difference of temperature between the liquid under treatment and the heating medium, which has been found to give the most satisfactory results.

Instead of the hand regulation referred to it is evident, that the temperature may be regulated by some known or convenient automatic temperature regulating device, by causing the heating medium or the liquid under treatment to be influenced by two heat regulators which are acted upon by the temperature of the liquids in the pipes $c$ and $d$. As a further alternative one regulator may be so influenced by the temperatures in these two tubes as to always maintain a constant difference of temperature in the system.

What I claim is:—

The process of sterilizing liquids, comprising circulating the liquid to be treated, recurrently from a reservoir, in countercurrent relation to a heated medium, until the desired temperature of the body of liquid to be treated is obtained, and regulating the temperature of the heating medium so as to maintain it constant, at an elevation of but a few degrees above the temperature of the liquid to be treated with which it is at that time in heat exchanging relation.

In testimony whereof I affix my signature.

CARL ADOLF HARTUNG.